United States Patent [19]

Retallick

[11] 3,901,821
[45] Aug. 26, 1975

[54] MULTI-COMPONENT CATALYST

[75] Inventor: William B. Retallick, West Chester, Pa.

[73] Assignee: Air Products and Chemicals, Inc., Allentown, Pa.

[22] Filed: Mar. 18, 1974

[21] Appl. No.: 452,417

[52] U.S. Cl.......... 252/410; 23/288 FB; 23/288 FC; 252/477 R; 423/213.7
[51] Int. Cl........................................... B01j 11/06
[58] Field of Search..... 252/410, 477 R; 23/288 FB, 23/288 FC; 423/212, 213.7; 117/119

[56] References Cited
UNITED STATES PATENTS

| | | | |
|---|---|---|---|
| 2,544,264 | 12/1970 | Hardison | 23/288 FB |
| 3,226,340 | 12/1965 | Stephens et al. | 252/465 |
| 3,288,558 | 11/1966 | Briggs et al. | 423/213.5 |
| 3,503,715 | 3/1970 | Haensel | 23/288 FB |
| 3,701,823 | 10/1972 | Hardison | 23/288 FB |
| 3,730,691 | 5/1973 | Lang et al. | 23/288 FB |

Primary Examiner—Winston A. Douglas
Assistant Examiner—P. E. Konopka
Attorney, Agent, or Firm—Barry Moyerman; Richard A. Dannells, Jr.

[57] ABSTRACT

A catalyst support body is impregnated selectively, to provide a central core portion containing a catalytically active component and a surrounding peripheral portion integral with and laterally enclosing said core, the peripheral portion being selectively impregnated with a catalyst component differing from that in the core. In the preferred embodiment the core contains catalyst active for $NO_x$ reduction and the peripheral portion contains catalyst active for CO oxidation. The catalyst is designed particularly for use in two stage treatment of I.C. engine exhaust gases.

14 Claims, 3 Drawing Figures

MULTI-COMPONENT CATALYST

BACKGROUND OF THE INVENTION

The present invention relates to catalyst production and is particularly concerned with impregnation of a catalyst support or carrier structure so as to provide a central or core portion impregnated with a catalytically active component and a peripheral portion surrounding the central core impregnated with a catalytically active component different from that in the core. Catalysts, produced in accordance with the invention, comprising a monolithic supporting body having one portion thereof impregnated with catalyst component active in reduction of nitrogen oxide gases and another portion impregnated with catalyst component active in promoting oxidation of carbon monoxide, are advantageously useful in catalytic treatment of internal combustion engine exhaust gases.

It was early recognized that a single catalyst was inefficient for the removal or conversion of all of the noxious components in the automotive engine exhaust. To obtain the desired goal for overcoming the problems of air pollution by such exhaust gas, it is necessary to rid such gas not only of unburned hydrocarbons and carbon monoxide, but also to convert the nitrogen oxides (designated $NO_x$) to inert or non-noxious form. Since conversion of nitrogen oxides to an inert form such as nitrogen involves reduction, and the conversion of hydrocarbons and CO to inert forms such as water and $CO_2$ involves oxidation, these diverse reactions posed a problem in the development of more efficient catalytic converters for automotive exhaust gases. To overcome this problem, separate catalytic treatment of the noxious components of the exhaust gas has been proposed by a number of different investigators. One such proposal, described in U.S. Pat. No. 3,544,264, involves the use of a concentrically partitioned cylindrical converter in which the inner cylindrical compartment is filled with reduction catalyst particles and the surrounding annular compartment is filled with oxidation catalyst. The hot exhaust gas first passes axially through the inner cylindrical catalyst compartment, then, reversing direction and combined with added air, passes axially through the annular catalyst compartment containing the oxidation catalyst.

It has also been proposed to employ separate catalyst containers in series, or separate catalyst chambers in series in a unitary housing to carry out a two-stage treatment of exhaust gases. For example, in U.S. Pat. Nos. 3,429,656 and 3,443,886 exhaust gas is initially treated with particulate catalyst for removal of oxygen and oxides of sulfur, followed by treatment of the gas with catalyst indicated to be effective in reacting CO and water to form hydrogen and in reduction of oxides of nitrogen with this hydrogen. In U.S. Pat. No. 3,476,508 separate layers or chambers containing particulate catalyst are arranged in sequence such that the gas to be treated, in the absence of added oxygen, first contacts catalyst intended to decompose hydrocarbons and next contacts catalyst which may contain hydrogenating metal for reducing nitrogen oxides.

It is also known to prepare catalyst particles in the form of granules, pellets, nodules, etc., wherein the interior of the particle is made to contain active catalyst component differing in concentration or composition from that incorporated on the exterior or outer section of the particle. Illustrative of the various methods employed in achieving such catalysts are those described in U.S. Pat. Nos. 3,288,558 and 3,360,330; employing successive impregnation.

The use of a single integral catalyst structure of extended dimensions for two-stage treatment of exhaust gas is disclosed in U.S. Pat. No. 3,410,651. The unit substrate is coated with a film of alumina, then a chromium compound is incorporated at one end of the coated substrate for removal of lead compounds from the gas, and an oxidation promoter incorporated in the other end of the unit.

In the treatment of automotive exhaust gases, it has been recognized that the same or a separate catalyst utilized, must be active initially for conversion of unburned hydrocarbons and CO during start-up of the cold engine and also be and remain active during the subsequent period to withstand, over a sufficiently extended period of use, repeated contact with the high temperature gas encountered in normal running operation.

The several advantages of using an integral monolithic catalyst structure of suitable size and shape within the converter housing, as distinguished from a bed of particulate granules, in the oxidation and/or reduction of noxious components of the exhaust gas, have been attested. Such unitary catalyst structures overcome the problems of high catalyst particle attrition which leads to channeling of the gas and/or by-passing of catalyst in the converter.

SUMMARY OF THE INVENTION

Among the objects of the present invention, in its more specific aspects, is the provision of a rigid integral catalyst unit embodying separate catalytic areas within the unit respectively capable of promoting reduction reactions on the one hand and promotion of oxidation reactions on the other. The production of such catalytic unit, in accordance with the present invention, entails the use of novel procedures to effect selective impregnation of the central portion or core of the catalytic unit so as to substantially confine the active catalytic material employed to such area substantially free of migration into adjacent surrounding area beyond the intended boundary, and separate impregnation of the outer lateral portion of the catalytic unit with different catalytic material confined substantially within the peripheral area or annulus surrounding the central portion or core.

The operation of the invention and the best mode of practicing the invention will be understood from the detailed description which follows read in connection with the accompanying drawings.

DETAILED DESCRIPTION OF THE INVENTION

Figure 1:
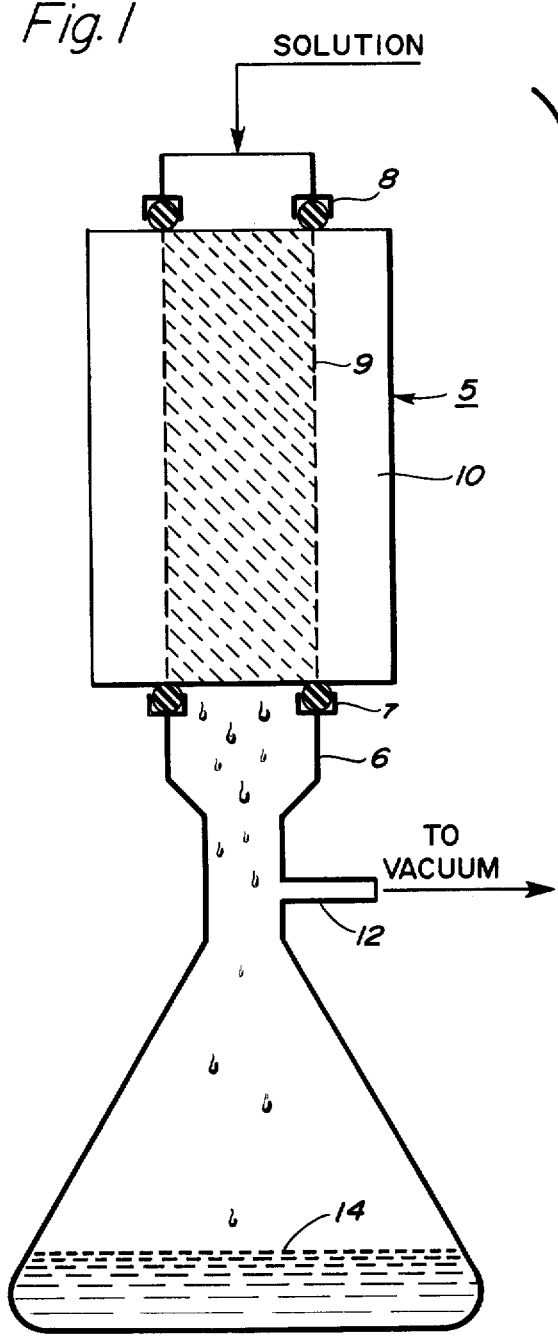
FIG. 1 is a diagrammatic elevational view illustrating the preferred manner of impregnating the central section of the catalytic unit.
Figure 2:
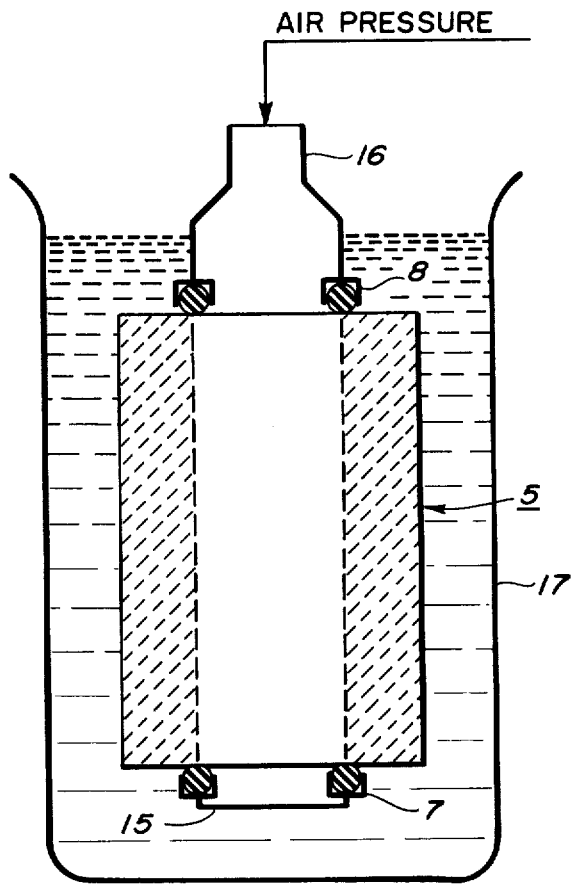
FIG. 2 is a diagrammatic elevational view illustrating the preferred manner of impregnating the outer portion of the catalyst unit.

The supporting body to be impregnated with the several active catalytic components is generally in the form of an extruded cylindrical monolith of refractory material which is selectively pervious to axial passage of fluids therethrough and resistant to transverse or radial fluid flow. The monolith may be composed of a refractory material of natural or synthetic origin, many types of which have been suggested in the literature, including but not limited to aluminum oxides, silica-alumina, natural refractory minerals comprising oxides or silicates of magnesium and/or aluminum, minerals comprising oxides or silicates of zirconium, or combinations of these. Specific minerals proposed as monoliths for catalyst include: spodumene, mullite spinel, etc. The more usual material generally employed as a catalyst support is extruded cordierite having longitudinal perforations extending through the length of the structure and resembling a honeycomb in cross section, or a bundle of parallel tubes, such as drinking straws, integrated at their peripheries into a unitary structure. Typically such monolithic structures are formed by extrusion of a plastic mass through dies. The exact method of their preparation is not important, as long as the monolithic catalyst support structures are provided with a number of small holes running through their axial length, permitting selective axial flow of fluid therethrough and wherein the lateral resistance is sufficiently high to overcome lateral diffusion or migration of fluid through the walls bounding the holes. The parallel holes may be round, square, tetragonal, polygonal or of any other configuration, in cross section.

While the monolithic body structure is shown at 5 to be cylindrical, it will be appreciated that structures of oval cross section or other convenient shapes may be employed substantially conforming to the size and configuration of the catalytic converter housing in which the catalytic unit is to be arranged. To obtain selective impregnation of the central portion or core of the cylindrical body 5, it is placed on end above a liquid-collecting vessel 6 with a seal ring 7 between the top rim of the vessel and the bottom of the cylindrical body. The seal ring is preferably formed with a channel or groove receiving an O-ring of rubber or other elastomer which is pressed against the bottom of the cylindrical monolith. Another seal ring 8 is similarly pressed against the top of the monolith. Each of the seal rings is held in place by suitable clamping means (not shown). The seal rings are of a diameter less than that of the cylindrical monolith, so that they define within their boundaries an axial cylindrical section or core 9 enclosed and surrounded by an annular peripheral section 10.

A suitable solution or suspension of the active catalytic material for the core section 9 is poured through the seal ring 8 from a suitable supply source (not shown) in prescribed concentration and dosage, while suction is applied, as indicated at 12, to draw the liquid through the core confined between the seal rings. Application of vacuum at the opposite end of the monolith and within the area encircled by seal rings, causes atmospheric air to be drawn radially into the core from the annular volume that surrounds the core. Thus induced radial flow of air prevents the solution or suspension from migrating out of core 9 into the surrounding annular volume 10. Excess liquid is collected in the receiver 6 as indicated at 14. After the liquid has been poured through the monolith, suction is continued until the liquid on the monolith has evaporated sufficiently to preclude migration of liquid from the core section 9 into the surrounding annulus 10. To obtain neat, well-rounded cores the impregnating liquid should be nearly saturated so that only a little evaporation prevents it from migrating.

After the core has been impregnated, the monolith is calcined to fix the catalytic metals and render them insoluble. Then the annulus is impregnated with metal different from that first employed for impregnation of the core. An imperforate plate or cap 15 is fixed against the bottom seal ring 7 and an inverted funnel-shaped hopper 16 fixed against upper seal ring 8. It will be understood, of course, that instead of the seal rings 7 and 8, a new set of seal rings may be employed, which, if desired may be attached to or integral with 15 and 16, respectively. The newly sealed assembly is now immersed in a vessel 17 containing a solution or suspension of the second active catalytic material. Air or other gas under a light superatmospheric pressure (about 10 to 20 inches of water), is admitted into the confined core. Since the monolith structure is porous, the admitted gas will leak from the core into the annulus, thus, opposing migration of the impregnating liquid into the core. After the desired impregnation of the annulus, the monolith is removed from the body of liquid, while air or other gas flow is maintained to blow excess liquid out of the annulus. As a further assurance against migration of liquid into the core during the impregnation of the annulus, the core may be prewet with water to avoid the effects of capillary forces which might otherwise tend to pull the surrounding liquid into the core.

In the preparation of a catalytic monolith for use in treatment of exhaust gases from internal combustion engines, the usual separate known catalyst components respectively active in reduction of $NO_x$ and in oxidation of CO and hydrocarbons, may be employed. The reduction catalyst is preferably employed to impregnate the core and the oxidation catalyst incorporated in the surrounding annulus. It will be understood, however, that the position of these catalytic components may be reversed, if desired, without departing from the principle of the invention.

Any of the oxidation catalysts that have been heretofore advocated for oxidation of CO and unburned hydrocarbons may be utilized in practice of the present invention such as Group VIII noble metals, particularly solutions or suspensions comprising platinum or palladium or mixtures of these in effective proportions. Among the reducing catalysts, one may employ base metals or their oxides, for example, copper oxide or metal oxides, of chromium or of the iron group or mixtures of these. Whereas, as heretofore indicated base metals or their oxides used for impregnating the core are preferably employed in highly concentrated form, the noble metal used for impregnation of the annulus are preferably applied in fairly dilute solution or suspension.

Figure 3:
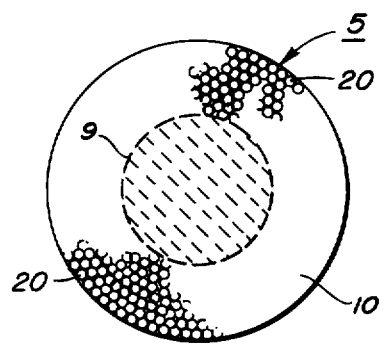
FIG. 3 is a plan view of catalytic unit, showing by shading the impregnated central section.

In FIG. 3, there is illustrated in plan view one form of available monolith that may be employed in practice of the invention. The illustration in FIG. 3 is largely diagrammatic and not drawn to scale; nor is it intended to depict precisely the relative size and spacing of the holes. It will be understood that the holes 20 (only a portion of which are shown in the drawings) extend uniformly across the entire cross sectional area of the monolith including the core portion represented by the shaded section 9.

It is important that the several catalytic components impregnating the monolith be confined to their separate regions. For example, if the oxidation catalyst, such as noble metal, is permitted to migrate from the annulus into the core, that portion entering the core is wasted since it would serve no useful purpose in $NO_x$ reduction or may even interfere with that reaction. The base metal, on the other hand, if permitted to migrate, would smother the catalytic activity of the noble metal.

In use, the monolith containing the several catalytic components respectively impregnating the core and the annulus, is placed in the catalytic converter as a unit. The converter is equipped with suitable valves and piping communicating respectively with the core portion and with the annulus. In a typical arrangement, the hot exhaust gas, without addition of external air, is passed through the core portion containing the catalyst promoting reduction of $NO_x$ into nitrogen, which may be in accordance with the theoretical equation $$2NO \rightarrow N_2 + O_2$$

or in the presence of adequate CO may follow the equation $$2NO + 2CO \rightarrow N_2 + 2CO_2$$

After the gas has passed through the core portion of the catalytic unit, it is mixed with air and the mixture passed in reverse direction through the annulus of the catalytic unit, containing the oxidation catalyst promoting combustion of hydrocarbons and CO. Suitable barriers are provided in the converter to confine the gases to the prescribed paths. Dual converters equipped with suitable valves and piping for selective flow of the initial hot exhaust gas in the absence of air through a section containing reducing catalyst and then, with addition of air, through a separate concentric compartment containing oxidation catalyst, are known in the art. These converters may be designed for different paths of flow of the exhaust gas during cold engine start up and during normal driving operation, consonant with the changing composition of the exhaust gas.

Since space is at a premium in converters associated with the muffler or the exhaust manifold of an automotive engine, the added advantage of using an integral catalytic unit for the two stage treatment of the exhaust gas will be appreciated. Moreover, by using the single catalytic unit, replacement of spent catalyst, an important cost factor in maintenance of catalytic converters, is greatly simplified.

While the invention has been described particularly with reference to catalytic units designed for use in treatment of exhaust gas from automotive engines, the principles of the invention may find other uses in which selective impregnation of the central region and of the surrounding outer portion of a catalytic unit is desired. The invention is also applicable to treatment of a catalytic support wherein a different concentration of catalyst is desired respectively at the outer surface and the inner core of the catalyst.

What is claimed is:

1. The method of selectively impregnating a porous catalyst support to provide a peripheral outer region selectively impregnated with one catalytic component, said outer region laterally enclosing an integral core portion selectively impregnated with a catalytic component different from the first mentioned catalytic component, which method comprises: maintaining an inwardly directed pressure differential between the outer lateral periphery of said support and said core portion while passing one impregnating liquid containing catalytic component axially through said core portion; and maintaining an outwardly directed pressure differential between said core portion and the outer lateral periphery of said support while contacting the outer periphery with impregnating liquid containing a different catalyst component.

2. The method as defined in claim 1 wherein said catalyst support comprises a substantially cylindrical porous monolith body selectively pervious to axial passage of fluids therethrough and resistant to radial fluid flow.

3. The method as defined in claim 1 wherein said catalyst support comprises a monolith block of refractory material having a plurality of longitudinally arranged perforations extending from end to end of said block.

4. The method as defined in claim 1 wherein one of said impregnating liquids comprises catalytic component active in reduction of nitrogen oxide gases and the other impregnating liquid comprises catalytic component active in oxidation of carbon monoxide.

5. The method as defined in claim 1 wherein said core portion is impregnated with catalyst component active in reduction of nitrogen oxide gases.

6. The method as defined in claim 1 wherein the outer portion of the catalyst support surrounding said core is impregnated with catalyst component active in oxidation of carbon monoxide.

7. The method as defined in claim 1 wherein said inwardly directed pressure differential is effected by applying suction at one end of said core.

8. The method as defined in claim 1 wherein said outwardly directed differential pressure is effected by passing gas at pressure above atmosphere axially into said core to diffuse laterally into the peripheral region surrounding said core.

9. The method of producing a catalyst unit having a porous body structure, a first catalytically active component selectively incorporated within a central core of such unit and a second catalytically active component selectively incorporated within the peripheral wall of said unit, which method comprises:

temporarily sealing a confined zone at one axial end of said unit by firm contact with a sealing ring pressed against said end, the outer edge of said ring being spaced inwardly from the lateral periphery of said unit at said end;

temporarily sealing a confined zone at the opposite axial end of said unit with a sealing ring pressed thereagainst, the outer edge of said ring being spaced inwardly from the lateral periphery of said unit at that end;

arranging one of the aforesaid sealed axial ends of said unit to place said core in peripherally sealed flow communication with a vacuum line, thereby creating flow of surrounding gas into said core and axially through said core;

placing the opposite sealed end portion of said unit in peripherally sealed flow communication with a supply of first impregnating liquid containing said first catalytically active component, whereby said liquid is caused selectively to impregnate the core portion of said unit;

discontinuing supply of said first impregnating liquid and thereafter discontinuing flow communication with said vacuum line;

introducing a gas stream under positive pressure at one peripherally confined end of said core portion, whereby said gas stream leaks transversely out of said core portion into the surrounding outer region of said unit and is dissipated within said outer region; and during flow of said gas stream contacting the peripheral surface of said unit with a liquid containing said second catalytically active component, thereby selectively depositing said second component within the outer peripheral portion of said unit surrounding said core portion.

10. The method as defined in claim 9 wherein said porous body is a substantially cylindrical monolith having a plurality of longitudinal perforations extending from end to end.

11. The method as defined in claim 10 wherein said core portion is impregnated with catalyst component active in reduction of nitrogen oxide gases.

12. The method as defined in claim 10 wherein said outer portion is impregnated with catalyst component active in oxidation of carbon monoxide.

13. The method as defined in claim 9, including the step of selectively wetting said core portion with water prior to contact of the peripheral surface of said unit with liquid containing the second catalytically active component.

14. The method as defined in claim 13 wherein said contact of the peripheral surface is effected by immersion of the unit in a body of liquid containing said second catalytically active component.

* * * * *